United States Patent Office 3,405,173
Patented Oct. 8, 1968

3,405,173
PREPARATION OF HYDROXYCARBOXYLIC
ACIDS AND DERIVATIVES THEREOF
Gerald Sugerman, Fort Lee, and John Kollar, Wallington,
N.J., assignors to Halcon International, Inc., a corporation of Delaware
No Drawing. Filed Apr. 17, 1963, Ser. No. 273,578
6 Claims. (Cl. 260—531)

This invention relates to a process for producing derivatives of hydroxycarboxylic acids. More specifically, this invention teaches the rearrangement of cycloalkanol oxidates in the presence of formic acid. Derivatives of hydroxycarboxylic acids are of much importance as chemical intermediates. For example, derivatives of hydroxycaproic acid are valuable precursors for the preparation of caprolactam, a valuable starting material for "nylon-6," and caprolactone. By further oxidation, adipic acid also may be produced from these derivatives.

Prior techniques for the preparation of hydroxycarboxylic acid derivatives, namely, omega-hydroxycaproic acid and omega-hydroxyvaleric acid, utilized mineral acids as the rearranging acids. The use of these materials, however, has disadvantages which have retarded the development of a successfully commercial process. For examples, the mineral acids such as hydrofluoric acid, in order to be effective, must be introduced into the rearrangement in a substantially anhydrous form. Since the hydrofluoric acid must be recycled in a commercial process, and further since water is formed in the rearrangement, it is necessary to separate this water from the hydrogen fluoride. This is particularly difficult because hydrofluoric acid forms an azeotrope with water which is extremely difficult to separate.

In accordance with this invention, it has been found that "cycloalkanol oxidates" may be rearranged to derivatives of hydroxycarboxylic acids by using formic acid as the rearranging agent.

The cycloalkanols, the oxidates of which are treated herein, may be defined by the general formula:

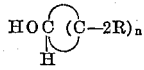

wherein $n$ is a whole integer from 4 to 11 and each R is selected from the group consisting of hydrogen; and alkyl group having from 1 to 16 carbon atoms, preferably from 1 to 6; and aryl group having from 6 to 14 carbon atoms; and aralkyl group having from 7 to 16 carbon atoms; a heteroaromatic group; a carboxyl group; a fluoro group; and a chloro group. Examples of these compounds include cyclopentanol; cyclohexanol; cycloheptanol; cyclooctanol;; cyclodecanol; and cyclododecanol. Substituted alkyl compounds include 2-methylcyclohexanol; 2,3-dimethylcyclooctanol; 2,2-dimethyl - 4 - ethylcyclododecanol; and 2-isopropylcyclopentanol. Other compounds include 2-benzylcyclohexanol; 2-(3-methylbenzyl-) cyclohexanol; 2-(2-pyridyl-) cyclopentanol; 3-carbomethoxycycloheptanol; 4-carbethoxycyclohexanol; and 1,3,4,5-tetrafluorocyclohexanol.

The hydroxycarboxyl acid derivatives are generally of the omega type, i.e., having the hydroxyl radical on the carbon atoms at the end of the chain opposite the carboxyl group. However, in the case where a carbon atom of a carbon containing radical is bonded to the ortho position in respect to the peroxide group, acids in addition to the omega type are formed. More generally, it may be stated that $(n+1)$-hydroxycarboxylic acid derivatives are formed, wherein $(n+1)$ represents the number of carbons in the ring of the cycloalkanol precursor, as $n$ was previously defined. As an example of products formed, the oxidation and rearrangement of 2-methylcyclohexanol may be considered. The major product obtained from the rearrangement of the oxidate would be 6-hydroxyheptanoic acid.

The "cycloalkanol oxidate" is obtained by the reaction of molecular oxygen with the cycloalkanol. It is preferable to oxidize from 10 to 30% of the cycloalkanol. The oxidation may be initiated by a peroxide and accomplished by passing molecular oxygen, pure or diluted with an inert gas, such as nitrogen, through the cyclohexanol with good agitation at temperatures of between 60 and 140° C. The pressures may be from atmospheric to 1000 p.s.i.a. or higher. The "oxidate" consists of a solution in the cycloalkanol of peroxide along with minor amounts of acid, esters and ketones. Generally the oxidate contains from 0.04 to 0.30 mole of peroxidic oxygen per 100 grams of oxidate.

Furthermore concentration of the "oxidate" by distillation, preferably under vacuum, can be achieved so as to obtain peroxide concentrations of up to about 0.5 mole of peroxide/100 grams. Such concentrates are also suitable.

The cycloalkanol oxidate, thus constituted, is treated in accordance with the invention at reaction temperatures between 0 and 200° C., preferably from 25 to 120° C., and most desirably between 40 and 95° C. The pressure, while not of particular significance, should preferably be approximately atmospheric. When higher temperatures are employed, such as in excess of 80° C., superatmospheric pressures are convenient to minimize the evaporation of formic acid and the other constituents present.

The amount of formic acid should be at least 0.2 mole per mole of peroxidic and hydroxyl groups. Generally, more than 2 moles per mole would be the practical upper limit, however, greater amounts may be added without detriment to the rearrangement. Preferably, 0.5 to 1.5 moles per total mole, and most desirably, 0.9 to 1.2 moles per total mole are used.

In a particularly preferred embodiment of the instant invention, a corresponding ketone is added to increase the yield. For example, when a cyclohexanol oxidate is being rearranged, cyclohexanone may be added. These corresponding ketones can be characterized by the general formula:

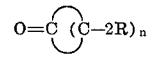

where R, and $n$, are as defined previously. Generally, between 1:1 and 5:1 moles of the ketone per mole of peroxidic oxygen, preferably, between 3:1 and 1:1 moles per mole, are employed. Amounts of the ketone exceeding 5 moles per mole may be used, but generally no advantage results and it is economically undesirable.

While anhydrous formic acid may be used, outstanding results may be also obtained with water solutions. Because of the water formed in the reaction, it is advantageous to recycle the azeotrope (78 wt. percent at atm. B.P. of formic acid). This azeotrope gives results substantially as good as the anhydrous material. Greater or lesser concentrations of formic acid in water may also be employed.

The derivatives of the hydroxycarboxylic acids may be readily converted to lactams and lactones. For example, by heating derivatives of hydroxycaproic acid to about 300° C. for about 20 hours in an autoclave at a pressure of 2000 to 2500 p.s.i.g., in the presence of ammonia and water, caprolactam may be prepared.

In order to more fully illustrate the invention, attention is directed towards the following examples:

EXAMPLE 1

Cyclohexanol oxidate is prepared by mixing 700 parts of cyclohexanol, 7 grams of commercial cyclohexanone peroxide and 7 grams of powdered magnesium carbonate in a flask. Oxygen is bubbled through the mixture at a rate of 0.7 liter per minute (N.T.P.) while the temperature is rapidly raised to 120° C. After 8 liters of oxygen are absorbed, the flask is cooled to 110° C. and the oxygen passed therethrough until a total of 17 liters of oxygen are absorbed. Titration of the oxidate indicates the presence approximately 0.1 mole of peroxidic oxygen per 100 grams of the oxidate. After filtering the oxidate free of solids, 100 parts by weight of the oxidate are combined with 25 parts of cyclohexanone and 60 parts of 98% formic acid. Table A shows the results obtained with series of examples at various temperatures. The residence time, where indicated, indicates the time required to decompose at least 95% of the peroxide. The yield is reported based on the moles of the peroxidic oxygen employed.

TABLE A

| Run No. | Temp., ° C. | Residence times, hrs. | Percent yield omega hydroxycaproic acid derivatives |
| --- | --- | --- | --- |
| 1 | 25 | 70 | 19 |
| 2 | 35 | 68 | 24 |
| 3 | 60 | 7 | 85 |
| 4 | 60 | (1) | 84 |
| 5 | 60 | 8 | 82 |
| 6 | 60 | (1) | 76 |
| 7 | 80 | 5 | 80 |
| 8 | 80 | 5 | 78 |
| 9 | 100 | (1) | 20 |

[1] After 18 hours more than 95% of peroxide decomposed.

It will be noted that the presence of formic acid results in marked improvement in the percent yield obtained as contrasted to thermal decomposition to the peroxide, wherein less than 5% is converted to the desired end products at 60° C. It is particularly noteworthy that the runs within the preferred range of the invention, namely, 40 to 95° C., give particularly outstanding yields generally in excess of 80%.

EXAMPLE 2

Using 100 parts of cyclohexanol oxidate prepared in accordance with Example 1, 25 parts of cyclohexanone, 60 parts of 98% formic acid and 15 parts of water are added. The amount of water added simulates the composition of formic acid water azeotrope obtained at atmospheric temperature (about 78 wt. percent formic acid). Runs are performed at temperatures within the preferred range and the following results obtained.

TABLE B

| Run No. | Temp., ° C. | Yield percent omega hydroxycaproic acid derivatives |
| --- | --- | --- |
| 1 | 80 | 72 |
| 2 | 80 | 76 |
| 3 | 80 | 87 |
| 4 | 80 | 89 |
| 5 | 60 | 74 |
| 6 | 60 | 71 |
| 7 | 60 | 74 |

The third and fourth runs noted above give outstanding yields. These experiments shown conclusively that extremely good yields may be obtained even in the presence of a significant amount of water. This clearly shows the advantage of the instant invention over the mineral acids of the prior art.

EXAMPLE 3

Again using 100 parts of the oxidate solution set forth in Example 1 runs were conducted to show the effect of the addition of cyclohexanone on the yield. All the runs are performed at 60° C. The results are illustrated in Table C.

TABLE C

| Run No. | Cyclohexanone added, moles/mole of peroxidic oxygen | Percent yield omega hydroxycaproic acid derivatives |
| --- | --- | --- |
| 1 |  | 47 |
| 2 |  | 46 |
| 3 | 1 | 67 |
| 4 | 1 | 64 |

It should be noted that the addition of the cyclohexanone, even in one mole per mole of peroxidic oxygen quantities, increases the yield to the omega hydroxycaproic acid derivatives about 50%. These data may be further compared to those set forth in Table A particularly Runs 3 to 6 conducted at 60° C., wherein 3 moles per mole of the cyclohexanone are added. Significantly higher yields are obtained with this additional amount. It should be noted that there is no net consumption of the cyclohexanone and it may be continuously recycled to the rearrangement after recovery.

EXAMPLE 4

A cyclohexanol oxidate is prepared in a manner similar to that set forth in Example 1. However, 0.15 mole of peroxidic oxygen is present in each 100 grams of oxidate. The following runs show the effect of varying the quantities of formic acid added to the oxidate. All the runs were performed at 80° C. The formic acid and the amount of water sufficient to simulate the 78% azeotrope is added. After maintaining the temperature for a time sufficient to consume at least 95% of the peroxide, the following yields are obtained.

TABLE D

| Run No. | Formic acid, parts | Yields percent omega hydroxycaproic acid derivatives |
| --- | --- | --- |
| 1 | 60 | 90 |
| 2 | 54 | 47 |
| 3 | 48 | 20 |

It should be noted that the system is particularly sensitive to the amount of formic acid present, best results being obtained with at least 0.6 part by weight of formic acid per part of oxidate.

It will be understood that modifications and variations may be affected without departing from the spirit of the invention.

We claim:

1. A process for the preparation of hydroxycarboxylic acids and derivatives thereof which comprises contacting an oxidate of a cyclic secondary alcohol having 5–12 ring carbon atoms with at least 0.2 mole of formic acid at a temperature between 0 and 200° C.

2. The process of claim 1 wherein the rearrangement is performed in the presence of a ketone which corresponds to said cyclic secondary alcohol.

3. The process of claim 1 wherein the formic acid contains water.

4. A process for the preparation of omega-hydroxycaproic acid and derivatives thereof which comprises: contacting an oxidate of cyclohexanol in the presence of at least 0.2 mole of formic acid while at a temperature of from about 40 to 95° C.; and separating an omega-hydroxycaproic acid product.

5. A process for the preparation of hydroxycarboxylic acids and derivatives thereof which comprises: contacting a cyclic secondary alcohol having 5–12 ring carbon atoms with molecular oxygen, thereby forming an oxidate; contacting said oxidate in the presence of at least 0.2 mole of formic acid at a temperature of from 0 to 200° C.; and separating hydroxycarboxylic acids and derivatives thereof.

6. A process for the preparation of hydroxycaproic acid and derivatives thereof which comprises: contacting cyclohexanol with molecular oxygen at a temperature between 60 and 140° C., thereby oxidizing from 10 to 30% of the cyclohexanol and forming a cyclohexanol oxidate; contacting said cyclohexanol oxidate with at least 0.2 mole of formic acid at a temperature from 0 to 200° C.; and withdrawing a product containing omega-hydroxycaproic acid and derivatives thereof.

References Cited

UNITED STATES PATENTS

| | | | |
|---|---|---|---|
| 3,234,212 | 2/1966 | Winnick et al. | 260—535 |
| 2,569,422 | 9/1951 | Levesque | 260—535 |
| 2,752,391 | 6/1956 | Gilbert et al. | 260—535 |
| 3,014,963 | 12/1961 | Shunk et al. | 260—535 |
| 2,946,818 | 7/1960 | Anagnostopoulos et al. 260—535 |  |
| 3,014,963 | 12/1961 | Shunk et al. | 260—535 |
| 2,840,553 | 6/1958 | Pieper | 260—239.3 |
| 2,840,554 | 6/1958 | Pieper | 260—239.3 |
| 3,234,212 | 2/1966 | Winnick et al. | 260—535 |

LORRAINE A. WEINBERGER, *Primary Examiner.*

VIVIAN GARNER, *Assistant Examiner.*